US006857299B2

(12) United States Patent
McNeil

(10) Patent No.: US 6,857,299 B2
(45) Date of Patent: Feb. 22, 2005

(54) MULTIPLE PADLOCK LATCH

(76) Inventor: Randy McNeil, 916 Juniper La., Estes Park, CO (US) 80517

( * ) Notice: Subject to any disclaimer, the term of this patent is extended or adjusted under 35 U.S.C. 154(b) by 21 days.

(21) Appl. No.: 10/431,731

(22) Filed: May 8, 2003

(65) Prior Publication Data

US 2004/0226322 A1 Nov. 18, 2004

Related U.S. Application Data

(60) Provisional application No. 60/396,190, filed on Jul. 16, 2002.

(51) Int. Cl.$^{7}$ ............................ F16H 57/00; G05G 5/00
(52) U.S. Cl. ................... 70/200; 70/DIG. 63; 292/148; 292/151; 292/283
(58) Field of Search ........................... 70/200, DIG. 63; 292/151, 148, 88, 104, 154, 205, 208, 211, 283, 284, 282, 329

(56) References Cited

U.S. PATENT DOCUMENTS

| | | | | |
|---|---|---|---|---|
| 1,213,863 A | * | 1/1917 | Goins | 292/120 |
| 2,707,125 A | | 4/1955 | Ritter, Sr. | |
| 3,656,789 A | * | 4/1972 | Ray | 292/304 |
| 3,889,497 A | | 6/1975 | Tuttle | |
| 3,988,031 A | * | 10/1976 | Meyer | 292/153 |
| 4,085,599 A | * | 4/1978 | Fischer et al. | 70/14 |
| 4,697,443 A | | 10/1987 | Hillin | |
| 4,997,219 A | | 3/1991 | Carter | |
| 5,020,342 A | * | 6/1991 | Doan et al. | 70/14 |
| 5,284,036 A | * | 2/1994 | Rosenbaum | 70/14 |
| 5,868,015 A | | 2/1999 | Eaker | |
| 6,557,384 B1 | * | 5/2003 | Cuesta | 70/14 |

* cited by examiner

*Primary Examiner*—John B. Walsh
(74) *Attorney, Agent, or Firm*—Ancel W. Lewis, Jr.

(57) ABSTRACT

A latch has a sliding bar, and multiple push bolts that each accept padlocks. The sliding bar is released by removing a padlock and pushing the corresponding push bolt. There is a master push bolt, with the remaining push bolts being slave push bolts. A master user, by removing the padlock from the master push bolt, can activate or deactivate any of the slave push bolts. Guard plates extend between and outside of the push bolts to protect the padlocks.

18 Claims, 6 Drawing Sheets

MULTIPLE PADLOCK LATCH

This application claims the benefit under 35 U.S.C. 119(e) of the U.S. provisional patent application No. 60/396,190 filed on Jul. 16, 2002.

TECHNICAL FIELD

The present invention relates to locking devices and more particularly to a latch for use with multiple padlocks.

BACKGROUND ART

Multiple lock systems are used to allow access to an area by multiple users while preventing access to unauthorized persons. Such systems may be used, for example, on property with oil and gas leases, hunting leases, or wireless communications towers. One advantage of multiple lock systems over a single lock system is that a user authorized to access multiple areas may use locks with the same key for each area, eliminating the need for that user to carry multiple keys and reducing confusion over which key provides access to which area. Another advantage is that when a user is no longer authorized to access the area, the user's lock can be replaced or eliminated, and the distribution of new keys to all of the other users is not required.

One simple prior known multiple lock system uses a chain around a gatepost and gate secured by multiple padlocks linked in series with each user having their own padlock and key. One disadvantage of this system is that a user may bypass one or more locks when resecuring the chain, thereby preventing access to the users of the bypassed locks. The padlocks are also vulnerable to being forced or cut open. Detection of an unauthorized lock, added by cutting the chain and inserting the lock, is very difficult with this system.

U.S. Pat. No. 2,707,125 to Ritter discloses a tubular multiple padlock system that mounts on a gatepost. U.S. Pat. No. 3,889,497 to Tuttle discloses a plate type multiple padlock -device where-padlocks must be used in multiples of four. U.S. Pat. No. 3,988,031 to Meyer and U.S. Pat. No. 4,997,219 to Carter disclose vertical wheel type multiple padlock devices where removal of a peripheral padlock provides access to a hole that allows retraction of a locking bar. U.S. Pat. No. 4,697,443 to Hillin discloses a horizontal wheel type multiple padlock device having radial access-channels with a fastening gate for each padlock. Each of the above patented devices has a predetermined number of positions for padlocks and none can be reconfigured as the number of users changes.

U.S. Pat. No. 5,868,015 to Eaker discloses a multiple padlock system with a locking bar and a plurality of coupling segments. Segments can be added or removed if the number of users changes. The number of segments cannot be controlled by a master user since any authorized user could add a segment. When a user is no longer authorized, that user's padlock and at least one segment must be removed to reconfigure the system. Such a reconfiguration requires coordination with one of the users adjacent to the user that is being removed, in order to remove the segment. In each of the above listed devices the padlocks are vulnerable to boltcutters or a sledgehammer.

Accordingly, there is a need for a multiple padlock system that can be readily reconfigured, without the coordination of several current users, as the number of users changes. A master user should be able to control the reconfiguration. The multiple lock system should also protect the padlocks from boltcutters and sledgehammers.

DISCLOSURE OF THE INVENTION

A multiple padlock latch includes a housing, a sliding bar extending through the housing, a swinging plate pivotally mounted in the housing, and a plurality of push bolts. The sliding bar is movable between a latched position and an unlatched position. The swinging plate is biased by a spring toward a first position and movable away from the first position to a second position. When the sliding bar is in the latched position and the swinging plate is in the first position, the swinging plate engages the sliding bar and prevents the sliding bar from moving. When the swinging plate is moved to the second position, the sliding bar is released. The push bolts are slidably mounted in apertures in the housing. Pushing a push bolt into the housing moves the swinging plate to the second position. Each push bolt has a padlock aperture and cannot be pushed into the housing when a padlock is in the padlock aperture. The push bolts include one master bolt and slave bolts. The user of the master bolt can activate or deactivate the slave bolts, so the number of users of the latch can be controlled and readily configured. Guard plates between the push bolts protect the padlocks from boltcutters and sledgehammers.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
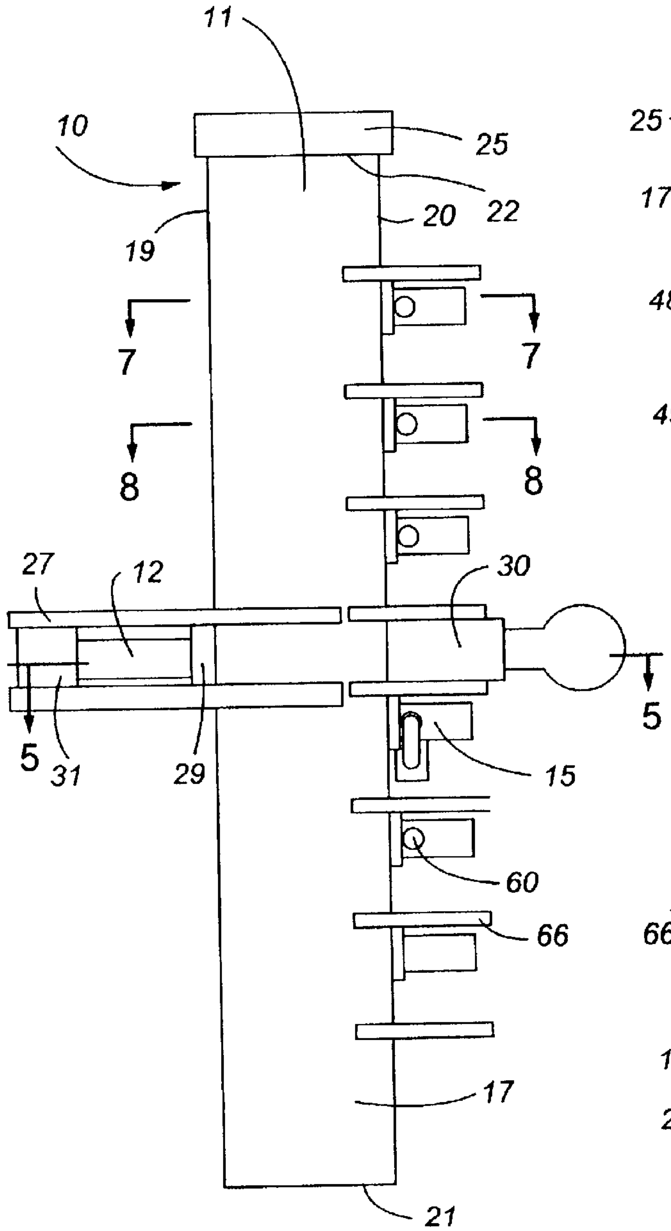
FIG. 1 is a front elevation view of a latch embodying features of the present invention.
Figure 2:
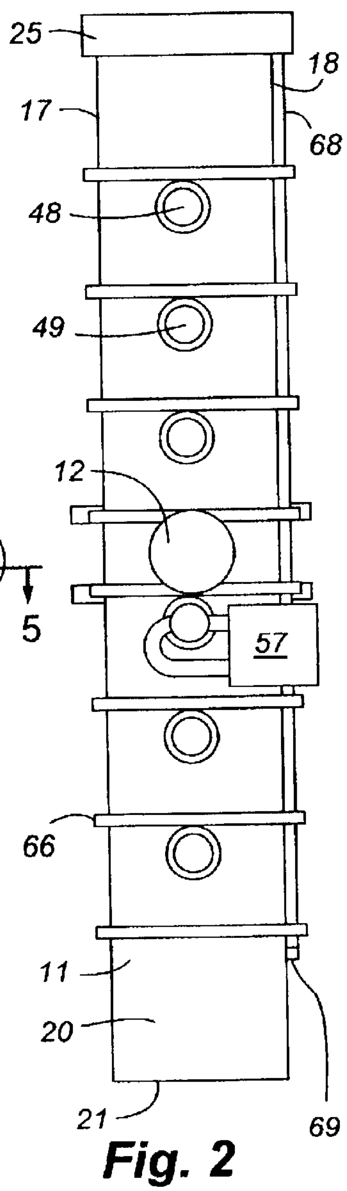
FIG. 2 is a side elevation view of the latch of FIG. 1.

Referring to FIGS. 1 to 4, a latch 10 embodying features of the present invention includes a housing 11, a sliding bar 12, a plate shown as swinging plate 14 and a plurality of push bolts 15. The latch 10 is preferably constructed of metal, such as steel, and as shown, is particularly suitable for mounting or incorporation into a fence gate or gatepost.

Describing the specific embodiments herein chosen for illustrating the invention, certain terminology is used which will be recognized as being employed for convenience and having no limiting significance. For example, the terms "front", "back", "top", "bottom", "vertical" and "horizontal" refer to the illustrated embodiments in the normal position of use. Further, all of the terminology above-defined includes derivatives of the word specifically mentioned and words of similar import.

The housing 11 shown is in the form of a vertically oriented, elongated square tube, having a front wall 17, a spaced back wall 18, spaced first and second side walls 19 and 20 each extending between the front and back walls 17 and 18, a closed bottom end 21, and an open top end 22, forming an interior cavity 23. A removable top cap 25 mounts in and closes the top end 22. Two spaced hook portions 27 are rigidly mounted on the housing 11 intermediate the bottom and top ends 21 and 22. The hook portions 27 extend in parallel from the first side wall 19 first outwardly, forwardly, then outwardly and then outwardly, rearwardly to form an open, rearwardly facing hook eye 28.

Figure 5:
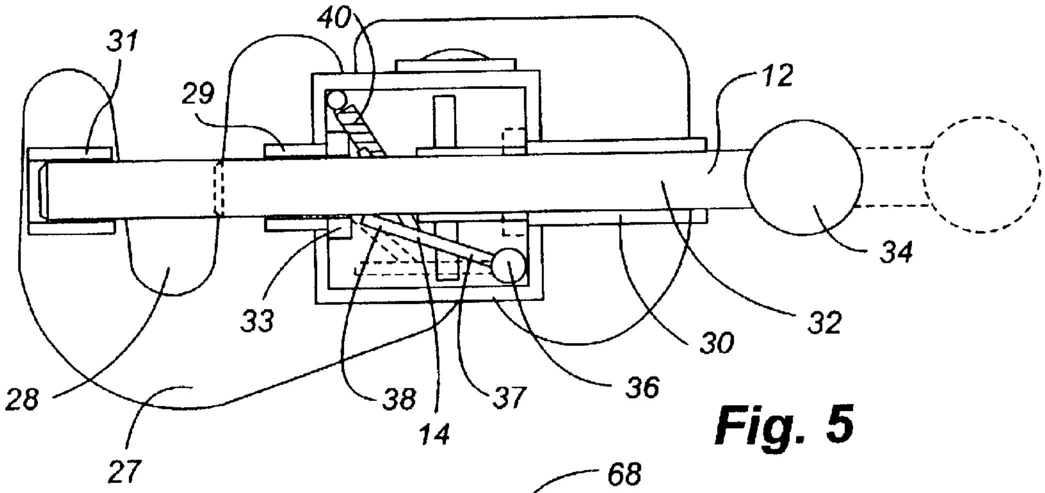
FIG. 5 is a sectional view taken through line 5—5 of FIG. 1.

As shown in FIG. 5, a hollow, cylindrical first sliding bar sleeve 29 mounts in and extends outwardly from the first side wall 19 between the hook latch portions 27. A hollow, cylindrical second sliding bar sleeve 30 mounts in and extends outwardly from the second side wall 20, opposite and aligned with the first sliding bar sleeve 29. A hollow, cylindrical end sleeve 31 mounts between the hook portions 27, opposite and aligned with the first sliding bar sleeve 29. The sliding bar 12 shown includes an elongated, cylindrical portion 32 and a stop ring 33. The cylindrical portion 32 is sized and shaped to slidably extend through the second sliding bar sleeve 30, through the first sliding bar sleeve 29 and across the open hook eye 28 and into the end sleeve 31, thereby closing the hook eye 28. A ball shaped grip 34 is provided on the end of the cylindrical portion 32 outward from the second sliding bar sleeve 30, to facilitate pulling the sliding bar 12.

The stop ring 33 fits around and is rigidly mounted on the cylindrical portion 32, inside the interior cavity 23 of the housing 11. The stop ring 33 is positioned on the cylindrical portion 32 such that when the stop ring 33 is against the first side wall 19, the sliding bar 12 is in the latched position and the cylindrical portion 32 extends completely across hook eye 28 and into the end sleeve 31, and when stop ring 33 is against the second side wall 20, the sliding bar 12 is in the unlatched position, shown in dashed lines, and the cylindrical portion 32 does not extend across hook eye 28.

Figure 6:
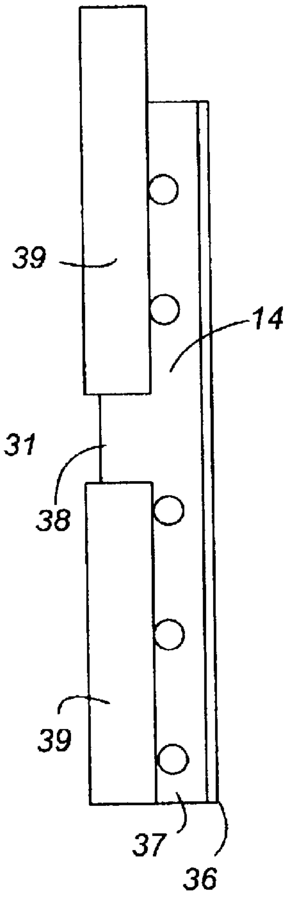
FIG. 6 is a front elevation view of the swinging plate of the latch of FIG. 1.
Figure 4:
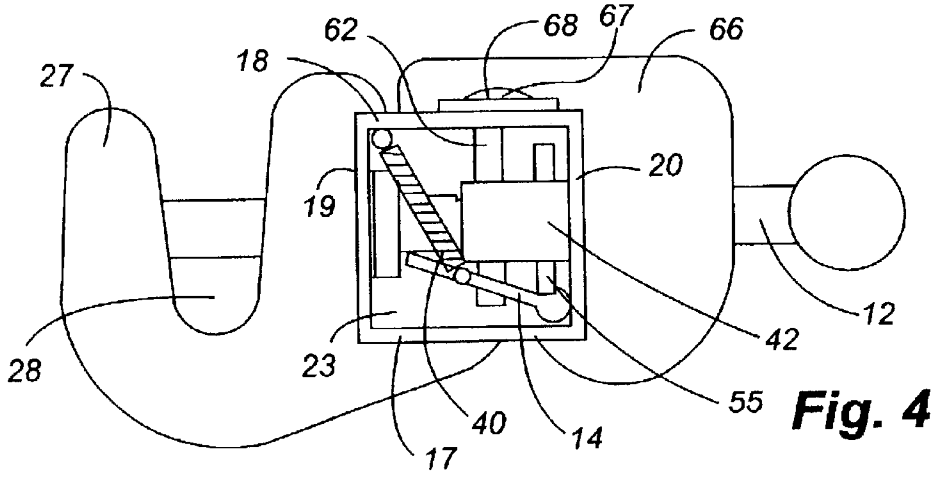
FIG. 4 is a top plan view of the latch of FIG. 1, with the top cap removed.
Figure 7:
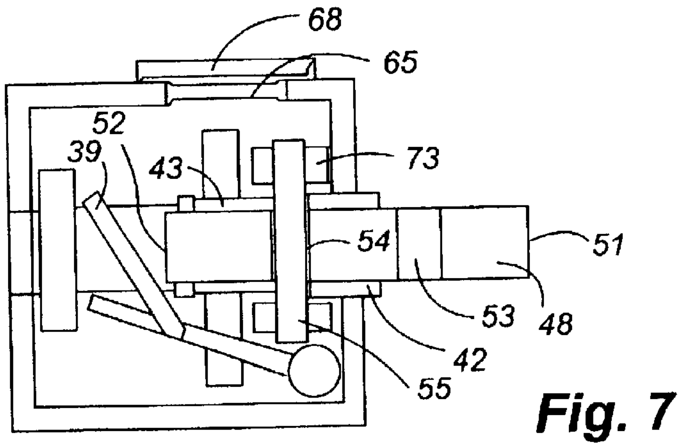
FIG. 7 is an enlarged, partial sectional view taken through line 7—7 of FIG. 1.

Referring to FIGS. 5, 6 and 7, the swinging plate 14 is pivotally mounted in the interior cavity 23 of the housing 11 on a vertical pivot 36 that extends along the corner formed by the front wall 17 and the second side wall 20. The swinging plate 14 has a generally planar base portion 37 extending away from the pivot 36, an engaging portion 38 extending away from and in line with the base portion 37, push portions 39 that extend away from the base portion 37 at a rearward angle, and springs 40. The springs 40 bias the swinging plate 14 rearwardly, and connect at opposite ends of the base portion 37. One end of each spring 40 connects to a corner of the base portion 37 opposite the pivot 36 and the other end of each spring 40 connects to the housing 11 at the corner formed by the back wall 18 and the first side wall 19.

The engaging portion 38 of the swinging plate 14 is aligned vertically with the sliding bar 12. When the sliding bar 12 is in the latched position, the springs 40 bias the swinging plate 14 rearwardly to a first position with the engaging portion 38 contacting the cylindrical portion 32 inward from the stop ring 33, blocking movement of the sliding bar 12 toward the unlatched position. When the swinging plate 14 is pivoted forwardly to a second position, shown in dashed lines in FIG. 5, the stop ring 33 clears the engaging portion 38 and the sliding bar 12 can move to the unlatched position. The engaging portion 38 is sized to contact the cylindrical portion 32 of the sliding bar 12 at a minimum distance inward from the stop ring 33, when the sliding bar 12 is in the latched position and the swinging plate 14 is in the first position, while clearing the stop ring 33 when the swinging plate 14 moves to the second position. Push portions 39 extend from the base portion 37 above and below the engaging portion 38.

Figure 3:
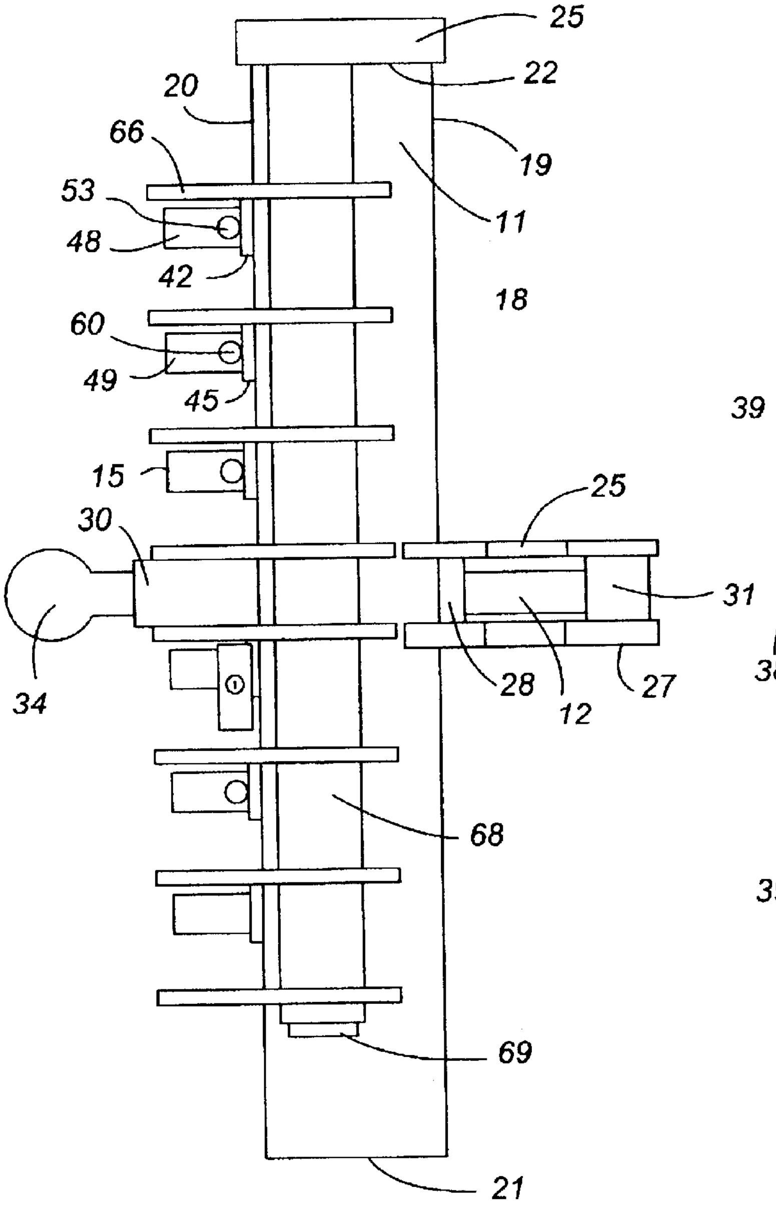
FIG. 3 is a back elevation view of the latch of FIG. 1.
Figure 8:
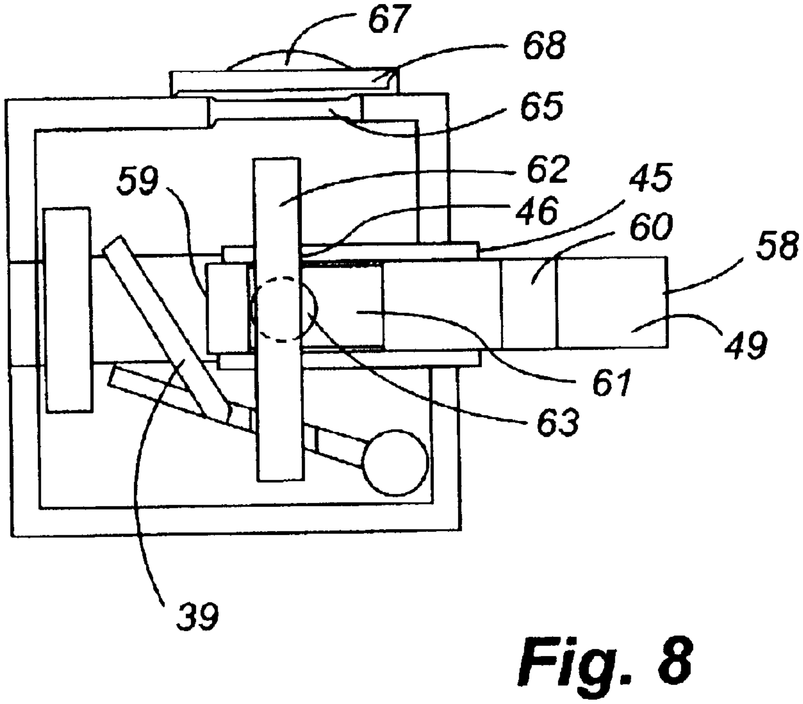
FIG. 8 is an enlarged, partial sectional view taken through line 8—8 of FIG. 1.

As shown in FIGS. 3 and 7, a hollow cylindrical master push bolt sleeve 42 is rigidly mounted, near the top end 22, in the second side wall 20 of the housing 11, and extends inwardly and outward from the second side wall 20, forming a master push bolt aperture. The master push bolt sleeve 42 includes two opposed, elongated, horizontal master push bolt sleeve slots 43, inward from the second side wall 20. As shown in FIGS. 3 and 8, a plurality of hollow, cylindrical slave push bolt sleeves 45 are rigidly mounted in the second side wall 20 of the housing 11, in a spaced configuration below the master push bolt sleeve 42 and above and below the sliding bar 12. The slave push bolt sleeves 45 extend inward and outward from the second side wall 20, forming slave push bolt apertures. A pair of horizontal, aligned, opposed slave push bolt sleeve apertures 46 extend thorough each slave push bolt sleeve 45 near the inward end.

The push bolts 15 shown have an elongated cylindrical shape and include a master push bolt 48 and a plurality of slave push bolts 49. Referring to FIG. 7, the master push bolt 48 has an outer end 51 and an inner end 52. The master push bolt 48 is sized to slidably fit into the master push bolt sleeve 42. A padlock aperture 53, near the outer end 51, and a parallel pin aperture 54, intermediate the padlock aperture 53 and the inner end 52, extend through the master push bolt 48. A removable master push bolt pin 55 is sized to fit snugly into the pin aperture 54 and extends outward from the pin aperture 54 through the master push bolt sleeve slots 43 when the master push bolt 48 is assembled into the master push bolt sleeve 42.

The distance from the inner end 52 to the pin aperture 54 of the master push bolt 48 is selected such that when the swinging plate 14 is in the first position and the inner end 52 of the master push bolt 48 contacts the push portion 39 of the swinging plate 14, the master push bolt pin 55 is at or near the outer extent of the master push bolt sleeve slots 43. The distance from the inner end 52 to the padlock aperture 53 of the master push bolt 48 is selected such that when the swinging plate 14 is in the first position and the inner end 52 of the master push bolt 48 contacts the push portion 39 of the swinging plate 14, the padlock aperture 53 is just outside the outer extent of the master push bolt sleeve 42, so that when a padlock 57 is in the padlock aperture 53, the master push bolt 48 cannot move the swinging plate 14 toward the second position. The distance from the inner end 51 to the outer end 52 of the master push bolt 48, and the length of the master push bolt sleeve slots 43 are each selected such that the master push bolt 4B pushes the swinging plate 14 to the second position before the outer end 52 of the master push bolt 48 reaches the outer extent of the master push bolt sleeve 42 and before the master push bolt pin 55 reaches the inner extent of the master push bolt sleeve slots 43.

Referring to FIG. 8, the slave push bolt 49 has an outer end 58 and an inner end 59. The slave push bolt 49 is sized to slidably fit into the slave push bolt sleeve 45. A padlock aperture 60, near the outer end 58, and a parallel elongated pin slot 61, intermediate the padlock aperture 60 and the inner end 59, extend through each slave push bolt 49. A removable slave push bolt pin 62 is sized to fit snugly into the slave push bolt sleeve apertures 46 and the pin slot 61 is sized to slidably receive the slave push bolt pin 62 when the slave push bolt 49 is assembled into the slave push bolt sleeve 45. The length and position of the pin slot 61 are selected such that when the swinging plate 14 is in the first position and the inner end 59 of the slave push bolt 49 contacts the push portion 39 of the swinging plate 14, the inner extent of the pin slot 61 is near the slave push bolt pin 62, and when the slave push bolt 49 pushes the swinging plate 14 to the second position, the outer extent of the pin slot 61 is near the slave push bolt pin 62.

The distance from the inner end 59 to the padlock aperture 60 and the distance from the inner end 59 to the outer end 58 of the slave push bolt 49 are selected in the same manner as the respective distances are selected for the master push bolt 48. A pin aperture 63, sized to receive the slave push bolt pin 62, extends through each slave push bolt 49 at the inner extent of the pin slot 61, perpendicular to the padlock aperture 60. When the slave push bolt pin 62 is assembled through the pin slot 61, the slave push bolt 49 is activated and can be pushed to release the sliding bar 12, if there is no padlock 57 in the padlock aperture 60. If the slave push bolt pin 62 is removed, the slave push bolt 62 rotated 90 degrees and the slave push bolt pin 62 assembled through the pin aperture 63, the slave push bolt 49 is deactivated and will not move if pushed inwardly.

Referring to FIGS. 3, 4, 7 and 8, the back wall 18 of the housing 11 has an elongated access opening 65 that extends from below the lowest slave push bolt 49 to above the master push bolt 48. The access opening 65 provides access to the slave push bolt pins 62, for activating or deactivating the slave push bolts 49. Solid, rigid guard plates 66 extend horizontally outward from the second side wall 20, between each pair of push bolts 15, with one additional guard plate 66 below the lowest slave push bolt 49 and another additional guard plate 66 above the master push bolt 48. The guard plates 66 extend outwardly beyond the push bolts 15.and protect the padlocks 57 from boltcutters and sledgehammers. The guard plates 66 also extend around and across the back wall 18.

Figure 9:
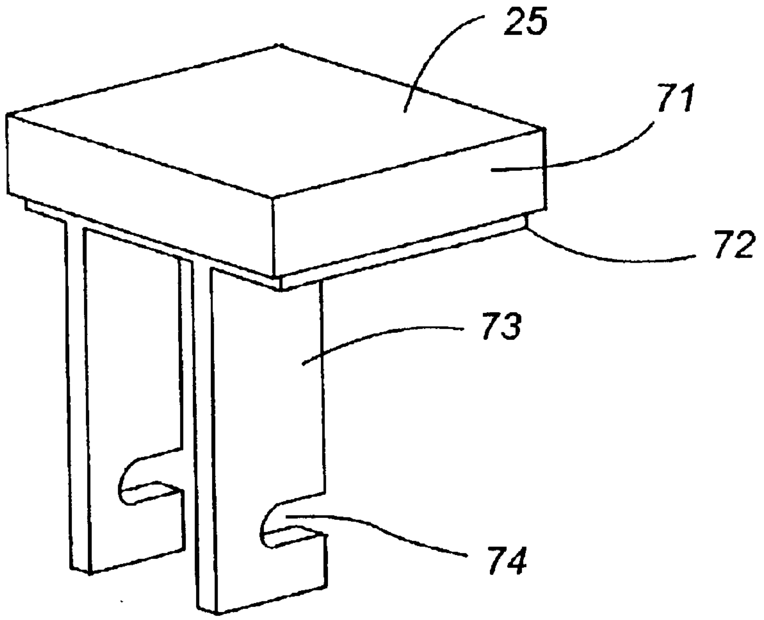
FIG. 9 is a perspective view of the top cap of the latch of FIG. 1.

Each guard plate 66 includes an inward opening access plate channel 67 extending across the access opening 65. An access plate 68 slides downwardly through the access plate channels 67 to cover the access opening 65. An access plate stop 69, rigidly mounted on the outside of the back wall 18 below the lowest guard plate 66, limits downward travel of the access plate 68. The top cap 25, as shown in FIG. 9, includes an upper portion 71 that fits over the top end 22 of the housing 11, a lower portion 72 that fits into the top end 22, and legs 73 that extend downwardly along the inside of the second side wall 20. The upper portion 71 of the top cap 25 extends beyond the top end 22 of the housing 11, preventing removal of the access plate 68 when the top cap 25 is in place. The legs 73 each include a notch 74 that opens toward the first side wall 19. The notches 74 are sized and positioned to receive the master push bolt pin 55 when the swinging plate 14 is in the first position. When the master push bolt 48 is pushed in, the master push bolt pin 55 clears the notches 74, releasing the top cap 25.

Figure 10:
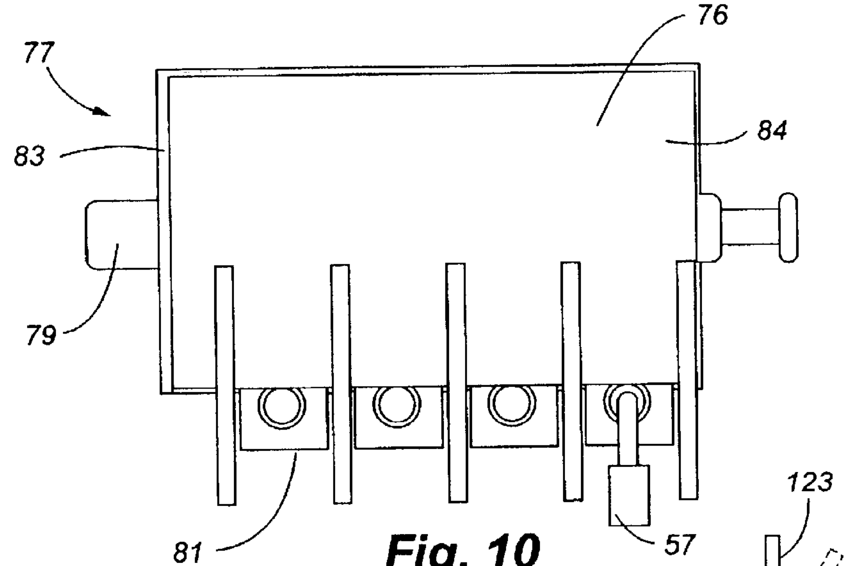
FIG. 10 is a front elevation view of an alternative embodiment of a latch embodying features of the present invention.
Figure 11:
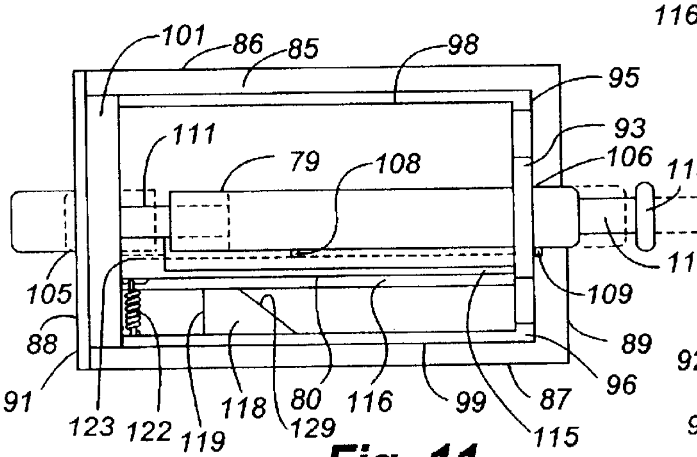
FIG. 11 is a front elevation view of the back portion of the housing of the latch of FIG. 10.

FIGS. 10–18 show an alternative embodiment of a latch 77 embodying features of the present invention. The latch 77 was not disclosed in the provisional application and is described herein to further illustrate the invention. Referring to FIGS. 10 and 11, latch 77 includes a housing 76, a generally cylindrical sliding bar 79, a swinging plate 80 and a plurality of push bolts 81. The housing 76 has a flat box shape, and includes a back portion 83 and a removable front portion 84. The back portion 83 can be mounted on or integrated into a gate, gatepost, door or doorframe. The removable front portion 84 provides access to the push bolts 81.

Figure 12:
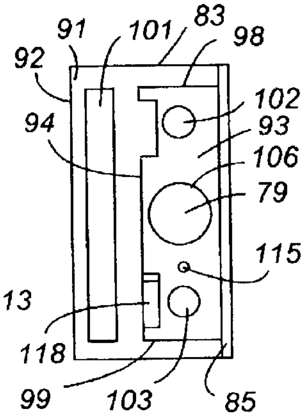
FIG. 12 is a side elevation view of the back portion of the housing of the latch of FIG. 10.
Figure 13:
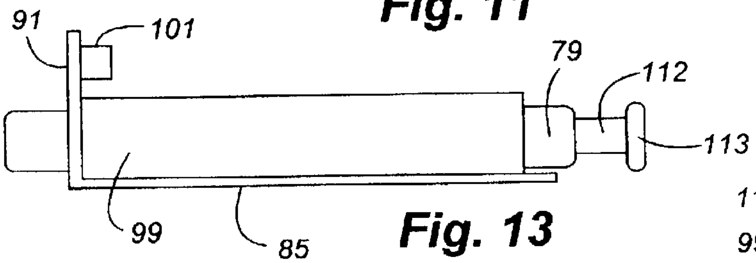
FIG. 13 is a bottom view of the back portion of the housing of the latch of FIG. 10.

The back portion 83, as shown in FIGS. 11, 12 and 13, includes a substantially flat back wall 85 with a top edge 86, a spaced bottom edge 87, a first side edge 88 between the top and bottom edges 86 and 87, and a spaced second side edge 89 between the top and bottom edges 86 and 87. A first side wall 91 projects forwardly from the first side edge 88 to a forward edge 92, extending from the top edge 86 to the bottom edge 87. A second side wall 93, inwardly spaced from the second side edge 89, projects forwardly to a forward edge 94 that is rearward of the forward edge 92 of the first side wall 91. The second side wall 93 has a top end 95 spaced downward from the top edge 86 and a bottom end 96 spaced upward from the bottom edge 87.

A top wall 98, inwardly spaced from the top edge 86, extends horizontally from the top end 95 of the second side wall 93 to the first side wall 91, and projects forwardly even with the front edge 94 of the second side wall 93. A bottom wall 99,inwardly spaced from the bottom edge 87, extends horizontally from the bottom end 96 of the second side wall 93 to the first side wall 91, and projects forwardly even with the front edge 94 of the second side wall 93. A vertical, rectangular housing attachment bar 101 projects inwardly from the first side wall 91, forward from the top and bottom walls 98 and 99. An upper housing attachment aperture 102 extends through the second side wall 93, adjacent to the top wall 98, and a lower housing attachment aperture 103 extends through the second side wall 93, adjacent to the bottom wall 99.

Aligned first and second sliding bar apertures 105 and 106, sized to receive the sliding bar 79, extend through the first and second side walls 91 and 93, respectively, between the upper and lower housing attachment apertures 102 and 103. Spaced inner and outer limit screws 108 and 109 are mounted on the sliding bar 79, inside and outside respectively of the second side wall 93, to limit movement of the sliding bar 79 between a latched position and an unlatched position. The unlatched position is shown in dashed lines in FIG. 11. A square shouldered stop groove 111 relieved into the sliding bar 79 is positioned to be adjacent and inside the first side wall 91 when sliding bar is in the latched position with the outer limit screw 109 against the outside of the second side wall 93. A pull groove 112 is relieved into the sliding bar 79, outward from the outer limit screw 109, to form an end disk 113, to facilitate pulling the sliding bar 79 from the latched position to the unlatched position.

Figure 14:
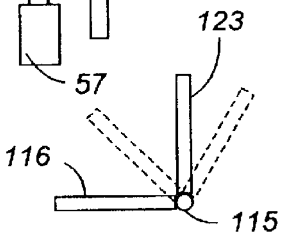
FIG. 14 is an end view of the swinging plate of the latch of FIG. 10.

Referring to FIGS. 11 and 14, the swinging plate 80 is pivotally mounted on a horizontal pivot 115 that extends between the first and second side walls 91 and 93. Pivot 115 is positioned between the second sliding bar aperture 106 and the lower housing attachment aperture 103 in the second side wall 93. The swinging plate 80 includes a flat; substantially rectangular push portion 116 that projects outwardly, generally forwardly, from pivot 115 and extends substantially the distance from the first side wall 91 to the second side wall 93.

A plate stop 118, spaced inward from the first side wall 91, projects upward from the bottom wall 99, to stop the swinging plate 80 at a first position with the push portion 116 substantially horizontal. The plate stop 118 has a vertical first edge 119 that faces the first side wall 91, and a spaced second edge that faces and slopes upwardly away from the second side wall 93. A spring 122 connects from the bottom wall 99 to the push portion 116 to bias the push portion 116 downward against plate stop 118.

The swinging plate 80 includes a flat, substantially rectangular engaging portion 123 that projects outward from the pivot 115, adjacent to the first side wall 91, generally upwardly and substantially perpendicular to the push portion 116. The engaging portion 123 is sized and positioned to fit into the stop groove 111 of the sliding bar 79 when the sliding bar 79 is in the latched position and the swinging plate 80 is in the first position, thereby preventing the sliding bar 79 from moving. When the push portion 116 is pushed upward, the swinging plate 80 pivots to a second position, shown in dashed lines in FIGS. 11 and 14, with engaging portion 123 clearing the stop groove 111 and thereby allowing the sliding bar 79 to move to the unlatched position with the inner limit screw 108 against the inside of the second side wall 93.

Figure 15:
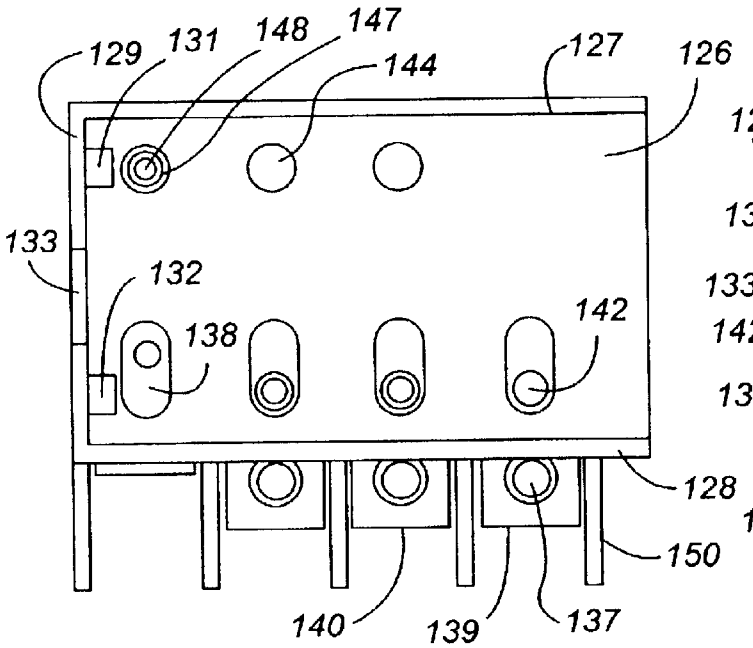
FIG. 15 is a back elevation view of the front portion of the housing of the latch of FIG. 10.
Figure 16:
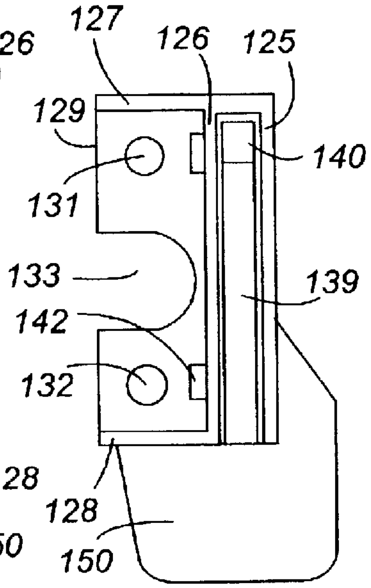
FIG. 16 is a side elevation view of the front portion of the housing of the latch of FIG. 10.
Figure 17:
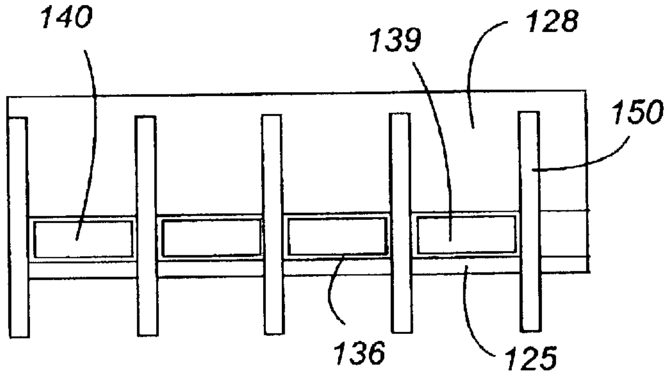
FIG. 17 is a bottom view of the front portion of the housing of the latch of FIG. 10.

Referring to FIGS. 15, 16, and 17, the front portion 84 of the housing 76 includes a front wall 125, a spaced back wall 126, a top wall 127, a bottom wall 128, and a side wall 129, with the top, bottom and side walls 127, 128 and 129 extending rearwardly from the perimeter of the front wall 125, connecting to the back wall 126 and extending rearwardly therefrom. The front portion 84 is sized to fit over the back portion 83 of the housing 76 with the back wall 126 of the front portion 84 forward of the sliding bar 79. The top, bottom and side walls 127, 128 and 129 of the front portion 84 each fit against the back wall 85 of the back portion 83, outside of the top, bottom and second side walls 98, 99 and 93 of the back portion 83.

The front and back walls 125 and 126 of the front portion 84 fit against the first side wall 91 of the back portion 83, with the housing attachment bar 101 being received between the front and back walls 125 and 126 of the front portion 84. The side wall 129 of the front portion 84 includes inwardly projecting upper and lower housing attachment stubs 131 and 132, sized and positioned to fit into the upper and lower housing attachment apertures 102 and 103 in the second side wall 93 of the back portion 83. The side wall 129 of the front portion 84 includes a rearwardly opening sliding bar notch 133, around the sliding bar 79 and between the upper and lower housing attachment stubs 131 and 132. The front portion 84 is removed from the back portion 83 by sliding the front portion 84 sideways away from the first side wall 91 of the back portion 83 until the housing attachment bar 101 clears the front portion 84 and the upper and lower housing attachment stubs 131 and 132 clear the back portion 83.

The push bolts 81 have an elongated rectangular shape and are sized to slidably fit between the front and back walls 125 and 126 of the front portion 84. A plurality of spaced push bolt apertures 135, sized to receive push bolts 81, extend through the bottom wall 128, between the front and back walls 125 and 126, of the front portion 84. For each push bolt aperture 135, a corresponding, vertically extending push bolt slot 136 extends though the back wall 126, above the bottom wall 128, of the front portion 84. Each push bolt 81 includes a padlock aperture 137 near the lower end.

The push bolts 81 include a master push bolt 139 and a plurality of slave push bolts 140. The master push bolt 139 is assembled in the push bolt aperture 135 nearest to the first side wall 91 of the back portion 83. The master push bolt 139 includes an engagement stub 142, spaced above the padlock aperture 137, that extends rearwardly through the push bolt slot 136. The distance from the engagement stub 142 to padlock aperture 137 is selected such that when the engagement stub 142 is at the bottom of the push bolt slot 136, the padlock aperture 137 is below the bottom wall 128 of the front portion 84.

When the engagement stub 142 is at the bottom of the push bolt slot 136, the engagement stub 142 extends rearwardly under the push potion 116 of the swinging plate 80 so that when the master push bolt 139 is pushed up; the engagement stub 142 moves the swinging plate 80 to the second position. When the engagement stub 142 is at the bottom of the push bolt slot 136, the engagement stub 142 engages the first edge 119 of the plate stop 118, preventing disassembly of the front portion 84 from the back portion 83 of the housing 76. When the master push bolt 139 pused up, the engagement stub 142 moves above the plate stop 118, allowing disassembly of the front portion 84 from the back portion 83 of the housing 76.

Figure 18:
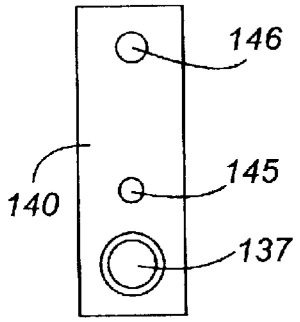
FIG. 18 is a front elevation view of a slave push bolt of the latch of FIG. 10.

A push bolt hole 144 extends though the back wall 126, below the top wall 127 of the front portion 84, above each push bolt slot 136, except the push bolt slot 136 for the master push bolt 139. Each slave push bolt 140, as shown in FIG. 18, includes a threaded lower aperture 145 and a threaded upper aperture 146. Each slave push bolt 140 also includes a threaded cap screw 147, sized to screw into the lower or upper aperture 145 or 146. The cap screw 147 shown is an Allen head screw with head 148.

The distance from the lower aperture 145 to padlock aperture 137 of a slave push bolt 140 is selected in the same manner as the distance from the engagement stub 142 to padlock aperture 137 of the master push bolt 139 is selected. The upper aperture 146 is located near the upper end of the slave push bolt 140. When the cap screw 147 is in the lower aperture 145 with the head 148 of the cap screw 147 in the push bolt slot 136, the slave push bolt 140 is activated. When the head 148 of the cap screw 147 is at the bottom of the push bolt slot 136, the head 148 extends rearwardly under the push portion 116 of the swinging plate 80 so that when the slave push bolt 140 is pushed up, the head 148 moves the swinging plate 80 to the second position. A slave push bolt 140 is deactivated by removing the cap screw 147 from the lower aperture 145, pushing the slave push bolt 140 upward until the upper aperture 146 is visible in the push bolt hole 144 in the back wall 126 of the front portion 84, and then assembling the cap screw 147 through the push bolt hole 144 into the upper aperture 146.

Solid, rigid guard plates 150 extend vertically downward from the bottom wall 128 of the front portion 84, between each pair of push bolts 81, with one additional guard plate 150 outside each of the outer push bolts 81, and protect the padlocks 57 from boltcutters and sledgehammers. Padlocks 57 in the padlock apertures 137 of the push bolts 81 prevent the push bolts 81 from being pushed up. When a padlock 57 is removed from a padlock aperture 137 of any push bolt 81, that push bolt can be pushed upward to release the sliding bar 79. The user of the master push bolt 139 can readily configure the latch 77 to the desired number of users by activating or deactivating slave push bolts 140.

The two embodiment are described to illustrate the variety of structure that can be used to implement the invention. Both embodiments include a housing, a sliding bar that moves between a latched and an unlatched position, a swinging plate biased toward a first position and movable to a second position, a master push bolt, a plurality of slave push bolts that can be activated or deactivated, and a means for accessing the slave push bolts, by the master push bolt user, for reconfiguring the slave push bolts. In the first embodiment the pivot 36 of the swing plate 14 is perpendicular to the sliding bar 12 while the pivot 115 of the swinging plate 80 in the second embodiment is parallel to the sliding bar 79. Push bolts 15 in the first embodiment are shown as cylindrical while push bolts 81 in the second embodiment are shown with a rectangular cross-section. A slave push bolt pin 62 is used to reconfigure the slave push bolts 49 in the first embodiment while a cap screw 147 is used to reconfigure the slave push bolts 140 in the second The slave push bolts 49 in the first embodiment are accessed for reconfiguration by removing the accessed plate 68 while the slave push bolts 140 in the second embodiment are accessed for reconfiguration by separating the front portion 84 from the back portion 83 of the housing 76.

The first embodiment preferably mounts vertically while the second embodiment preferably mounts horizontally, when used on a horizontally moving gate or door.

Although the shown sliding bars 12 and 79 are substantially straight, other configurations can be used. The plate, shown as swinging plates 14 and 80 that pivot, may alternatively be designed to move linearly. The latches 10 and 77 can readily be reconfigured for a different number of users by activating or deactivating slave push bolts 49 or 140. When a slave push bolt user is no longer authorized, the master push bolt user can deny that slave push bolt user access by removing that slave push bolt user's slave push bolt with the padlock 57, and inserting another slave push bolt, either activated for a new user or deactivated. The master push bolt user can reconfigure the number of users without cooperation or coordination of the slave push bolt users.

Although the present invention has been described with a certain degree of particularity, it is understood that the present disclosure has been made by way of example and that changes in details of structure may be made without departing from the spirit thereof.

What is claimed is:

1. A multiple padlock latch comprising:

a housing having a plurality of spaced push bolt apertures, a sliding bar extending into said housing and movable between a latched position and an unlatched position, a plate in said housing biased toward a first position and movable to a second position, said plate engaging said sliding bar and preventing said sliding bar from moving when said sliding bar is in said latched position and said plate is in said first position, and said plate allowing said sliding bar to move to said unlatched position when said plate is moved to said second position, and a plurality of push bolts extending through and slidable in said push bolt apertures, and configurable to move said plate to said second position when one said push bolt is pushed inwardly into said housing, each said push bolt including a padlock aperture sized and shaped to fit a padlock and positioned to prevent said push bolt from moving said plate when said padlock is in said padlock aperture.

2. The latch as set forth in claim 1 wherein said plurality of push bolts includes a master push bolt and at least one slave push bolt, and each said slave push bolt is configurable between an activated configuration and a deactivated configuration.

3. The latch as set forth in claim 2 wherein said housing includes a slave push bolt sleeve for each said slave push bolt with each said slave push bolt sleeve having opposed slave push bolt sleeve apertures inside said housing, and each said slave push bolt includes a longitudinally extending pin slot, a pin aperture transverse to said pin slot and a slave push bolt pin sized to fit through said slave push bolt sleeve apertures and sized to fit through said pin slot and said pin aperture, said slave push bolt being activated with said slave push bolt pin sliding in said pin slot when said slave push bolt pin is assembled through said slave push bolt sleeve apertures and said pin slot, and said slave push bolt being deactivated when said slave push bolt pin is assembled through said slave push bolt sleeve apertures and said pin aperture.

4. The latch as set forth in claim 2 wherein each said slave push bolt includes a threaded upper aperture, a threaded lower aperture and a cap screw having a head and sized to thread into said upper and lower apertures, said slave push bolt being activated with said head engaging and moving said plate when slave push bolt is pushed, when said cap screw is in said lower aperture, and said slave push bolt being deactivated when said cap screw is in said upper aperture.

5. The latch as set forth in claim 2 wherein said housing includes means for accessing said slave push bolts to activate and deactivate said slave push bolts, and means, coupled to said master push bolt, for preventing unauthorized access to said slave bolts.

6. The latch as set forth in claim 5 wherein said means for accessing includes an access opening in said housing that provides access to said slave push bolts to configure said slave push bolts between said activated configuration and said deactivated configuration.

7. The latch as set forth in claim 6 wherein said means for preventing access includes an access plate that covers said access opening.

8. The latch as set forth in claim 7 wherein said means for preventing access includes a top cap on said housing that prevents removal of said access plate, said top cap being secured by said master push bolt until said master push bolt is pushed in and being released when said master push bolt is pushed in.

9. The latch as set forth in claim 5 wherein said housing includes a back portion and a front portion removable from said back portion, and said means for accessing includes said front portion.

10. The latch as set forth in claim 9 wherein said means for preventing access includes a plate stop on said back portion, and an engagement stub on said master push bolt that engages said plate stop and prevents removal of said front portion until said master push bolt is pushed in, and that releases said front portion when said master push bolt is pushed in.

11. The latch as set forth in claim 1 including a plurality of spaced guard plates rigidly attached to said housing between said push bolts and outside said push bolts to protect padlocks in said padlock apertures.

12. The latch as set forth in claim 1 wherein said plate is a swinging plate pivotally mounted on a pivot in said housing.

13. The latch as set forth in claim 12 wherein said swinging plate includes an engagement portion that engages said sliding bar and holds said sliding bar in said latched position when said swinging plate is in said first position, and that clears and releases said sliding bar when said swinging plate moves to said second position.

14. The latch as set forth in claim 12 wherein said swinging plate includes push portions that said push bolts contact and push to move said swinging plate to said second position.

15. The latch as set forth in claim 12 wherein said sliding bar extends though said housing transverse to said pivot.

16. The latch as set forth in claim 12 wherein said sliding bar extends though said housing parallel to said pivot.

17. A multiple padlock latch comprising:

an elongated housing having a master push bolt sleeve, a plurality of spaced slave push bolt sleeves, an access opening, an access plate covering said access opening, an access plate stop, spaced guard plates and a removable top cap, said guard plates extending outward from said housing between and outside of said master and slave push bolt sleeves and across said access opening and each having an access plate channel that captures said access plate, said access plate stop stopping one end of said access plate and said top cap stopping an opposite end of said access plate, each said slave push bolt sleeve having opposed slave push bolt sleeve apertures inside said housing, a sliding bar having a cylindrical portion and a stop ring, said cylindrical portion extending through said housing and movable between a latched position and an unlatched position, said stop ring being rigidly mounted on said cylindrical portion inside said housing, a swinging plate pivotally mounted on a pivot in said housing, biased by a spring toward a first position and movable to a second position, said swinging plate having an engaging portion and push portions, said engaging portion engaging said stop ring and preventing said sliding bar from moving when said sliding bar is in said latched position and said swinging plate is in said first position, and said engaging portion clearing said stop ring and allowing said sliding bar to move to said unlatched position when said swinging plate is moved to said second position, a master push bolt extending through and slidable in said master push bolt sleeve, said master push bolt contacting a said push portion of said swinging plate and moving said swinging plate to said second position when said master push bolt is pushed into said master push bolt sleeve, said master push bolt including a padlock aperture sized and shaped to fit a padlock and positioned to prevent said master push bolt from moving said swinging plate when said padlock is in said padlock aperture, said master push bolt being coupled to said top cap and holding said top cap until said master push bolt is pushed in and releasing said top cap when said master push bolt is pushed in, and a plurality of slave push bolts extending through and slidable in said slave push bolt sleeves, and each including a longitudinally extending pin slot, a pin aperture transverse to said pin slot, a slave push bolt pin sized to fit through said slave push bolt sleeve apertures and sized to fit through said pin slot and said pin aperture, and a padlock aperture sized and shaped to fit a padlock and positioned to prevent said slave push bolt from moving said swinging plate when said padlock is in said padlock aperture, each said slave push bolt being configurable between said activated configuration and said deactivated configuration, each said slave push bolt being activated with said slave push bolt pin sliding in said pin slot when said slave push bolt pin is assembled through said slave push bolt sleeve apertures and said pin slot, and each said slave push bolt being deactivated when said slave push bolt pin is assembled through said slave push bolt sleeve apertures and said pin aperture, each said slave push bolt, when activated, contacting a said push portion of said swinging plate and moving said swinging plate to said second position when said slave push bolt is pushed into said slave push bolt sleeve, and each said slave push bolt, when deactivated, being held by said slave push bolt pin in said pin aperture and prevented from moving said swinging plate to said second position when said slave push bolt is pushed.

18. A multiple padlock latch comprising:

a housing having a back portion and a removable front portion, said back portion including a plate stop, said front portion including a front wall, a spaced back wall, and a bottom wall connected to said front and back walls, said bottom wall having a master push bolt aperture, a plurality of spaced push bolt apertures, and guard plates extending downward from said bottom wall between and outside of said master and slave push bolt apertures, said back wall having a push bolt slot aligned above each of said master and slave push bolt apertures and a push bolt hole above each said push bolt slot that is above a slave push bolt aperture, an elongated cylindrical sliding bar extending through said back portion, movable between a latched position and an unlatched position, and having a stop groove in said back portion, a swinging plate pivotally mounted on a pivot in said back portion, biased by a spring toward a first position and movable to a second position, said swinging plate having an engaging portion that engages said stop groove to prevent said sliding bar from moving when said sliding bar is in said latched position and said plate is in said first position, and that clears said stop groove and allows said sliding bar to move to said unlatched position when said swinging plate is moved to said second position, said swinging plate having a push portion extending from said pivot transverse said engaging portion, a master push bolt slidable in said master push bolt aperture, said master push bolt having an engagement stub, in said push bolt slot above said master push bolt aperture, and a padlock aperture, said engagement stub that extending through and rearwardly from said back wall, said engagement stub engaging said push portion and pushing said swinging plate to said second position when said master push bolt is pushed up, said engagement stub engaging said plate stop and preventing said front portion from being removed from said back portion until said master push bolt is pushed up and releasing said front portion when said master push bolt is pushed up, and said padlock aperture being spaced below said engagement stub, sized and shaped to fit a padlock, and positioned to prevent said master push bolt from moving when said padlock is in said padlock aperture, a plurality of slave push bolts slidable in said slave push bolt apertures, and configurable between an activated and a deactivated configuration, each said slave push bolt having a threaded upper aperture, a threaded lower aperture and a cap screw having a head and sized to thread into said upper and lower apertures, said slave push bolt being activated, with said head engaging and moving said swinging plate to said second position when slave push bolt is pushed, when said cap screw is in said lower aperture in said push bolt slot, and said slave push bolt being deactivated when said cap screw is in said upper aperture in said push bolt hole, and each said slave push bolt having a padlock aperture sized and shaped to fit a padlock and positioned to prevent said slave push bolt from moving said swinging plate when said padlock is in said padlock aperture.

* * * * *